US008219860B2

(12) United States Patent
Fey et al.

(10) Patent No.: US 8,219,860 B2
(45) Date of Patent: Jul. 10, 2012

(54) MICROPROCESSOR SYSTEM FOR CONTROLLING AT LEAST PARTLY SAFETY-CRITICAL PROCESSES

(75) Inventors: Wolfgang Fey, Niedernhausen (DE); Andreas Kirschbaum, Darmstadt (DE); Adrian Traskov, Steinbach (DE)

(73) Assignee: Continental AB & Co. oHG, Frankfurt (DE)

( * ) Notice: Subject to any disclaimer, the term of this patent is extended or adjusted under 35 U.S.C. 154(b) by 515 days.

(21) Appl. No.: 12/063,467

(22) PCT Filed: Aug. 2, 2006

(86) PCT No.: PCT/EP2006/064977
§ 371 (c)(1),
(2), (4) Date: Mar. 26, 2010

(87) PCT Pub. No.: WO2007/017445
PCT Pub. Date: Feb. 15, 2007

(65) Prior Publication Data
US 2010/0185927 A1    Jul. 22, 2010

(30) Foreign Application Priority Data

Aug. 11, 2005  (DE) .......................... 10 2005 038 306
Aug. 2, 2006   (DE) .......................... 10 2006 036 386

(51) Int. Cl.
*G01R 31/28* (2006.01)

(52) U.S. Cl. ............. 714/712; 714/819; 714/15; 714/32
(58) Field of Classification Search ................. 714/712, 714/819, 15, 32
See application file for complete search history.

(56) References Cited

U.S. PATENT DOCUMENTS

| 5,862,502 | A | * | 1/1999 | Giers ............................. 701/71 |
| 5,915,082 | A | | 6/1999 | Marshall et al. |
| 6,201,997 | B1 | | 3/2001 | Giers |
| 6,223,309 | B1 | * | 4/2001 | Dixon et al. .................. 714/703 |
| 6,823,251 | B1 | | 11/2004 | Giers |

* cited by examiner

*Primary Examiner* — Guy Lamarre
(74) *Attorney, Agent, or Firm* — Brinks Hofer Gilson & Lione

(57) ABSTRACT

The invention relates to a microprocessor system (60) for controlling and/or regulating at least partly security-critical processes, which system comprises two central processing units (1, 2) integrated into a chip housing, a first and a second bus system, at least one complete memory (7) on the first bus system, and check data in one or more check data memories, said data being related to data of the memory in the first bus system. The check data memory is smaller than the complete memory. The bus systems comprise comparative and/or driver components which facilitate data exchange and/or comparison of data between the two bus systems. The one or more check data memories are arranged on the first bus system. On the second bus system, neither a check data memory nor a memory safeguarding data of the memory on the first bus is used. The invention also relates to the use of the inventive microprocessor system in automotive control devices.

8 Claims, 2 Drawing Sheets

MICROPROCESSOR SYSTEM FOR CONTROLLING AT LEAST PARTLY SAFETY-CRITICAL PROCESSES

BACKGROUND OF THE INVENTION

The invention relates to a microprocessor system—for controlling safety-critical processes, with two central processing units integrated in a chip housing, two bus systems, at least one complete memory on the first bus system, test data in test data stores which are connected to data in the memory on the first bus system, where the test data store is smaller than the complete memory and the bus systems have comparison and/or driver components which allow the data interchange and/or comparison of data between the two bus systems.

DE 195 29 434 A1 (P 7959) discloses such a microprocessor system for safety-critical applications. For reasons of redundancy, this microprocessor system contains two homogeneous microprocessor cores (core redundancy) which execute the same program in clock synchronism and in parallel. The bus systems associated with the microprocessor systems are likewise provided in duplicate, but the memory is not of fully symmetrical design, for reasons of cost. It has been found that a high error recognition rate can be achieved if one of the two bus systems stores only test data in a test data store with relatively low storage capacity, said test data being explicitly associated with the complete data in the complete memory. So that both cores each have all the data available in redundant form, the complete data are continually compared with the test data using hardware generators. The hardware generators can either generate test data or can complement the test data for comparison using the complete data (data error correction).

It is an aim of the present invention to specify an alternative two-core microprocessor system which likewise comprises a complete memory and a test data store of relatively small size for storing redundancy information which is associated with the original data stored in the complete memory, and where the microprocessor system has an increased error recognition rate in comparison with corresponding two-core microprocessor systems.

SUMMARY OF THE INVENTION

To achieve this objective, the microprocessor system based on the invention comprises two central processing units integrated in a chip housing.

Each processing unit has an associated dedicated bus system (first and second bus), which means that this bus system is likewise of redundant design.

The microprocessor system also comprises a test data store on the first bus which has a reduced storage capacity in comparison with the complete memory in the first bus system. The test data store stores the test data, which are connected to data in the memory on the first bus system.

The test data store is used to store test data which are connected to data in the complete memory. Storing the test data serves to identify typical data store errors, which can arise in rare cases during read or write operations. Such errors can also be recognized by virtue of the complete memory being provided in duplicate and the data being stored twice in identical form. This is cost-intensive, however, since the memory makes up a considerable portion of a chip's manufacturing costs. It has been found that in line with the microprocessor system based on the present invention it is also possible to effect adequate error recognition using a redundancy memory having a reduced memory space requirement, the test data store. To this end, by way of example, a data word (data item) in the complete memory has a test information item or a test value (e.g. parity information, Hamming code or the like) stored for it in the test data store. In the simplest case, this may be a parity bit having a length of 1 bit. More complex encoding methods, e.g. Hamming codes, can also allow error correction and recognize multiple errors. The parity information item may be formed on a word-by-word basis and/or in combination from a plurality of data words in the complete memory (blockwise test data encoding).

Preferably, only part of the complete memory is backed up by a test data store. In this case, there are therefore memory areas in the complete memory which are not backed up against errors. These memory areas can be filled with less important program functions which are not safety-critical. However, it is also possible for the whole complete memory to be backed up by the test data store.

In addition, the bus systems comprise comparison and/or driver components which allow the data interchange and/or comparison of data between the two bus systems.

At least the second bus system has an inherently known hardware test data generator arranged on it which is produced by logic gates, for example. The test information required for recognizing memory errors is consequently not generated by a central processing unit (CPU) but rather by what is known as a hardware test data generator arranged physically separately from the CPU. A hardware test data generator is preferably an essentially hardwired semiconductor structure which takes a prescribed logic as a basis for performing particular work steps for data processing and/or signal processing independently without the aid of a central processing unit. Although the operations performed by the hardware generator could in principle also be performed by the central processing unit, this is usually associated—besides with a possible increased error rate—with a higher clock cycle consumption, which would greatly increase the delay time.

The test data store preferably has an independent additional address decoder which is actuated particularly by the processing unit on the second bus. The second bus system particularly preferably has neither a test data store nor a memory arranged on it which is used to back up data in the memory on the first bus.

The complete memory is preferably a read/write memory. However, it is also possible for a read-only memory (e.g. ROM, Otp ROM, EPROM, EEPROM or Flash ROM) to be backed up on the basis of the inventive principle.

Although the method of backup using a test data store which is known from DE 195 29 434 A1 meets the availability demands which are required for today's applications, there are, besides the memory errors mentioned, also additional types of error which the known architecture cannot safeguard against. By way of example, it is not possible to recognize errors on the address bus and errors in the address decoder. Although blockwise test data encoding for generating test information would allow these additional types of error to be recognized, this method would be limited to the application of a read-only memory. Therefore, in line with the invention, at least part of the complete memory is backed up using a test data store, likewise arranged on the memory's bus, and appropriate test data. This achieves recognition of the aforementioned additional types of error.

Preferably, the microprocessor system based on the invention has a device for address error recognition implemented in it. This is designed, in particular, such that means are provided which include the address of the data to be backed up in the calculation of the test data. With quite particular preference, writing involves particularly the test data, which are check bits, for example, being calculated not only using the data bits but also using the data to be backed up and the associated address. In this way, addressing errors can be recognized when the data are read. The address error recognition is preferably provided on each of the two bus systems.

An alternatively preferred means for address error recognition comprises a device which is additionally implemented in a microprocessor system and which performs one or more tests for address error recognition in the background. This type of error recognition is expediently not performed in parallel during read/write access operations. Instead, this error recognition measure is taken particularly only within the context of a periodic separate check in which there are preferably no further fundamental CPU activities. The alternative address error recognition described here may be in the form of software or in the form of a hardware measure. The means described here may be in the form of a type of built-in self test, particularly within the CPU or within the hardware state machine.

In line with the self test, the memory preferably has a predefined pattern written to it and then read from it. The pattern may particularly preferably be in a form such that possible decoding errors or actuation errors intentionally result in corruption of the data. During reading, this intentionally caused error is then recognized.

In addition or as an alternative to the two aforementioned error recognition devices, an addressing error recognition means is preferably implemented in which a memory cell has the address of the memory cell written to it and then checked.

An example of the previously described method is what is known as the "Address-to-Data" test. This test involves each memory location having the numerical value of the address of the memory location written to it:

| Address | Data item |
|---------|-----------|
| 0x00    | 0x00      |
| 0x01    | 0x01      |
| ...     |           |
| 0xff    | 0xff      |

In the event of an error, one number is then not read back and another is doubled instead.

The test data store used in line with the invention is in principle a conventional read/write memory, but with a reduced storage capacity in comparison with the complete memory.

The microprocessor systems are integrated in a common chip housing and are preferably operated in clock synchronism. Preferably, both systems are arranged on a common semiconductor material.

The microprocessor system comprises two bus systems which preferably each comprise a data bus, an address bus and a control bus.

In addition to the read/write memory or memories, there is naturally also at least one read-only memory for operating the microprocessor system. The term read-only memory is understood, in line with the invention, to mean a memory which is nonvolatile at least for a certain time, such as particularly of the ROM, Flash ROM or OTP ROM type. In line with the principle of core redundancy, it is then not absolutely necessary for both bus systems to have full or identical-content read-only memories on them. If the redundancy concept is also transferred to the read-only memory, which is preferred, then provision is made for appropriate test information to ensure that the data in the read-only memory are backed up. This can be achieved particularly by a smaller read-only memory on the second bus which contains suitable test information instead of the data.

Preferably, the microprocessor system based on the invention is used to store test data additionally on the first bus in the physical memory or at least in direct proximity to the full read/write memory. In direct proximity means that the relevant chip structures adjoin one another, which means that it is possible to observe the necessary short delay time for the data.

The microprocessor system is preferably designed such that a read cycle involves the data in the complete memory being compared with test data associated with these data by one or more hardware test units which is/are positioned particularly in or in proximity to the data memory area. The hardware correction unit(s) correct(s) the data in the case of an error using the test data. By way of example, this correction allows simple errors, such as an incorrect bit, to be readily corrected, so that the microprocessor system does not need to be switched off. Depending on the complexity of the test word, it is thus also possible to intercept more complicated errors. If correction is not successful, that is to say if the error in the data was so complex that logic combination with the test information causes the corrected data still to be erroneous, then these data are spotted by a preferably present further comparison unit which compares the data queuing on the parallel bus systems. Consequently, an error signal is expediently output on a suitable error line which, in particular, shuts down the microprocessor system or decouples it from the rest of the electronics. In an electronic braking system, for example, this effectively prevents the valve drivers from being actuated by mistake.

Address errors can be recognized, in accordance with the invention, by virtue of the independent addressing of the test data store on account of the additional address decoder actuated by means of the processing unit on the second bus. A test data store on the second bus can advantageously be dispensed with in this manner. In addition, this also results in a simplified design for the error recognition device on the second bus, which contains no error generation circuits, in particular.

Finally, the invention also relates to a second embodiment of the inventive microprocessor system—, which is a further development of the system described above—.

In contrast to known error-correcting/error-recognizing microprocessors, which use the principle of core redundancy and which contained only mechanisms for recognizing/correcting errors in one memory cell, the invention now allows the whole memory to be backed up. This allows the redundancy concept used to be expanded from the read-only memory to the data store too. This allows a further reduction in the manufacturing costs while retaining the existing safety requirements.

Further details—can be found in the—following description of exemplary embodiments with reference to figures—.

DETAILED DESCRIPTION OF THE DRAWINGS

Figure 1:
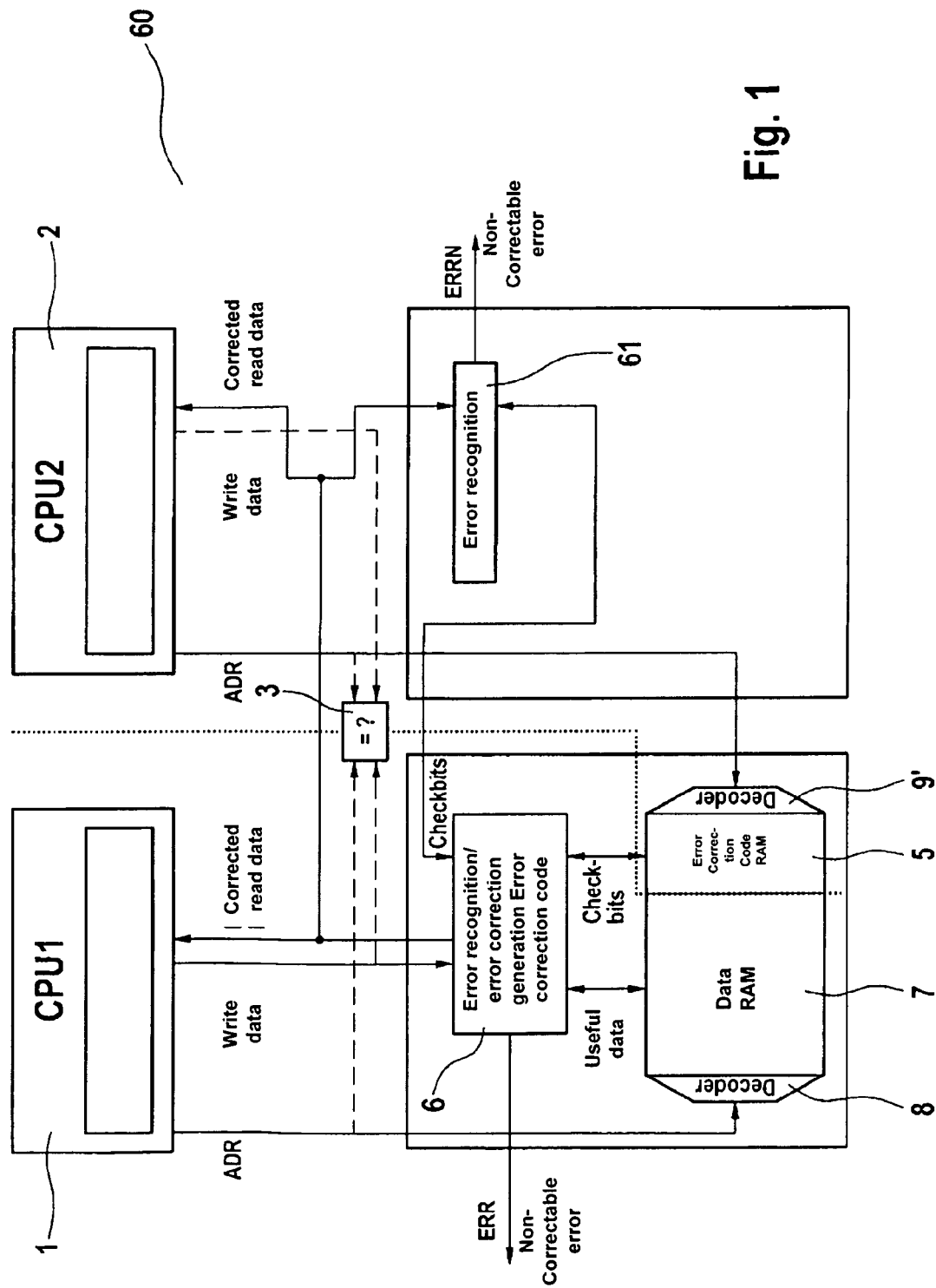
FIG. 1 shows a first example of a two-core integrated microcontroller with a data store and a test memory with separate addressing.

The microcontroller in FIG. 1 comprises two central processing units (CPU) 1, 2 which operate in clock synchronism.

Both microcomputers execute the same program. Each unit has a respective separate associated address and data bus. The CPU 1 has a complete data store 7 connected to it. In addition, the microprocessor system comprises a comparator 3 which is in the form of a hardware element and which is used to continually compare the queuing addresses and data on the two bus systems with one another. If there is no match, an error signal is produced. For the purpose of simplified illustration, the figures do not show the components which are usually present in microprocessor systems in more detail, such as input/output units, read-only memories etc. These components which are not shown are essentially based on the redundant-core microcontroller described in WO99/35543.

The test data store 5 on the first bus has a storage capacity which is reduced by the factor 8 in comparison with the memory 7. The memory 5 is used to store test data which are generated by the hardware generator 6 practically at the same time during each write operation for data by the CPU 1 in the memory 7. Generating the test data without program-related means allows the write operation to be performed in principle without increased clock cycle consumption.

Reading involves the memory 7 being addressed by the CPU 1 using the address decoder 8. During the read operation, the hardware unit 6 is active. The hardware unit 6 is used to check the data in line with the test data generation method (e.g. Hamming code) and possibly to correct them immediately. The bus drivers which a block 3 contains are used to provide the queuing data for CPU 1 and CPU 2 at the same time.

If the data and the test data do not match, an error is recognized. Although error recognition 61 also takes place on the second bus, it relates to data which are possibly corrected in the area of the first bus. This check is performed in the hardware comparator 61, which can likewise generate an error signal. The test data store 5 is arranged in physical proximity to the data store 7 so that the data can be corrected within a short time and hence such correction is still possible within the prescribed timing.

In line with the example in FIG. 1, the block comprising the complete data store 7 and the checksum memory 5 on the first bus has an additional address decoder 9' added to it which decodes the addresses for access to address areas of the test data store 5 which come from the CPU 2. To this end, a direct link between the address bus associated therewith and the decoder 9' is provided. The address decoder 8 decodes memory access operations by the CPU 1 which are in the address area of the complete memory 7. The test data read are routed via block 6 directly to error recognition block 61. In contrast to block 6, error recognition block 61 does not itself contain any error correction devices. Block 61 compares the test data with the data routed to the second bus via the driver stages. To this end, the checksum is again formed from the (possibly corrected) read data. This checksum is compared with the test data read from the memory. The error recognition on the second bus involves the test data store 5 being addressed by the CPU 2. The recognition of address errors is ensured by the independent addressing of the checksum memory with the decoder 9'.

Figure 2:
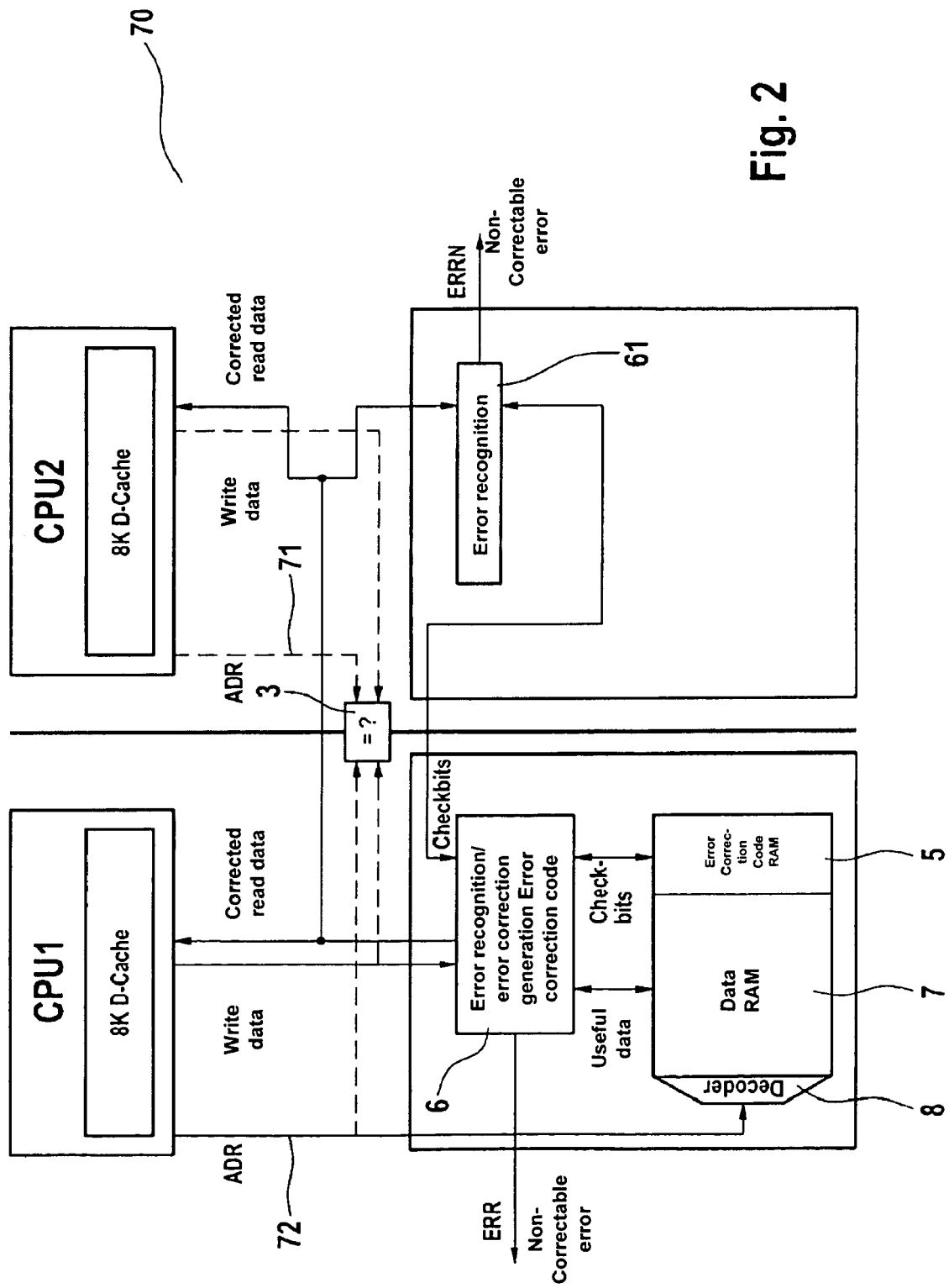
FIG. 2 shows a second example of a two-core integrated microcontroller of particularly simple design which has a data store and a test memory.

The microprocessor system in FIG. 2 also combines the complete data store 7 and the checksum memory 5 in a common block in accordance with the example in FIG. 2. The error recognition and correction method in blocks 6 and 61 is likewise based on the principle in FIG. 1. The microprocessor system in FIG. 2 differs from the microprocessor system in FIG. 1 inter alia in that the address decoder 9' is dispensed with. The correct address generation by the CPU 1 is checked by comparing it with that from the CPU 2 (which executes the same code). Within the comparator 3, the address of the CPU 2 is compared with the address currently referenced by the CPU 1, and if they do not match then an error signal is generated. The particular feature of the microprocessor system based on the example in FIG. 2 is primarily that the microprocessor area of the CPU 2 contains neither a test data store nor a data store. Only block 61 for error recognition during reading and writing is duplicated in the area of the CPU 2 in line with the error recognition 6 in block 6.

The fact that the second address decoder is missing in the microprocessor system shown in FIG. 2, in contrast with the example in FIG. 1, means that it is not possible to recognize address errors on the basis of redundancy. To implement address error recognition nonetheless, the test data generation in block 6 involves the address of the memory address to be written being included too. During writing, the check bits are calculated not only using the data bits from a memory location in the memory 7 but also by including the address of this memory location. If there is an error in the addressing, it can be found during a read access operation.

The invention claimed is:

1. A microprocessor system for controlling or regulating at least partly safety-critical processes, comprising two central processing units integrated in a chip housing, a first and a second bus system, at least one complete memory on the first bus system, test data in at least one test data store, the test data being related to data in the memory on the first bus system, the at least one test data store having a smaller storage capacity than the complete memory on the first bus system, the at least one test data store being arranged on the first bus system, and the second bus system having no test data store and no memory for backing up data in the memory on the first bus, the first bus system comprising a first hardware unit for comparing data from the complete memory with the test data associated with these data and, in the event of conflict, correcting the data from the complete memory using the test data to produce corrected data, and the second bus system comprising a second hardware unit comparing the corrected data with the test data and generating an error signal when the test data are in conflict with the corrected data.

2. The microprocessor system as claimed in claim 1, wherein the first hardware unit comprises a hardware test data generator which generates the test data for the at least one test data store.

3. The microprocessor system as claimed in claim 1, wherein the complete memory and the at least one test data store on the first bus each have a dedicated address decoder, with at least one of these address decoders being connected to the second bus system.

4. The microprocessor system as claimed in claim 1, wherein the test data on the first bus are stored in a physical memory block of the complete memory or in direct proximity to the complete memory.

5. The microprocessor system as claimed in claim 1, wherein the first and the second bus system each comprise a data bus, and address bus, and a control bus, and wherein at least one comparison structure is implemented in hardware and, during each read/write operation, compares addresses of queued data on the data buses with one another and generates an error signal if the addresses differ.

6. The microprocessor system as claimed in claim 1, wherein the first and the second bus system each comprise a data bus, an address bus, and a control bus, and wherein a comparison structure is implemented in hardware, which, during each read/write operation, compares queuing addresses on the address buses with one another and generates an error signal if the addresses differ.

7. The microprocessor system as claimed in claim 5, wherein a read cycle involves the data in the complete memory being, prior to the comparison in the comparison structure, tested for errors using the test data memory area associated with the complete memory directly on this bus and an error signal being produced in the event of an uncorrectable error.

8. The microprocessor system as claimed in claim 1, wherein the first and the second bus system each comprise a data bus, an address bus, and a control bus, and wherein the address bus for the second processing unit is backed up by comparing it with the address bus for the first data bus, and a memory group comprising the complete memory and the test data store comprises only one address decoder.

* * * * *